Figure 1:
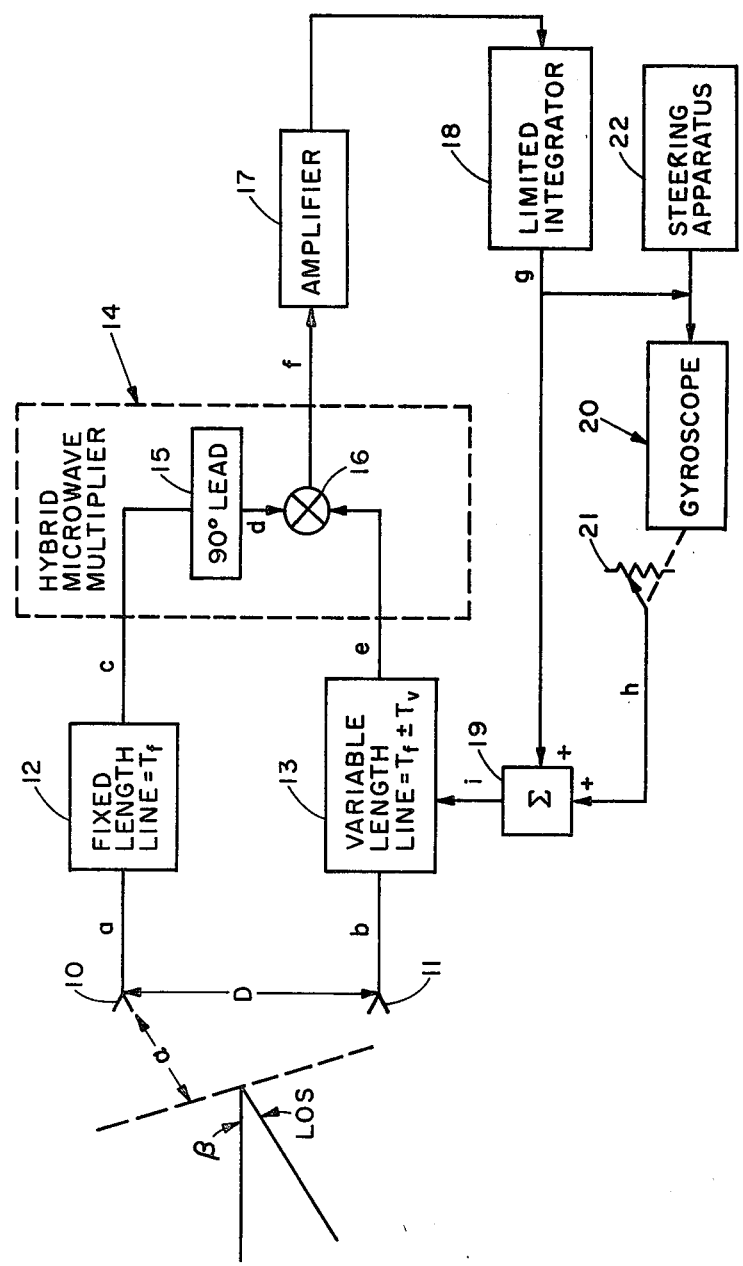

United States Patent [19]

Gulick et al.

[11] 4,204,655

[45] May 27, 1980

[54] BROADBAND INTERFEROMETER AND DIRECTION FINDING MISSILE GUIDANCE SYSTEM

[75] Inventors: Joseph F. Gulick, Clarksville; James S. Miller; Alan J. Pue, both of Columbia, all of Md.

[73] Assignee: The United States of America as represented by the Secretary of the Navy, Washington, D.C.

[21] Appl. No.: 964,767

[22] Filed: Nov. 29, 1978

[51] Int. Cl.² ............................................... H04B 7/00
[52] U.S. Cl. .............................. 244/3.19; 343/100 SA
[58] Field of Search ............................. 244/3.19, 3.14; 343/100 SA, 6 DF

[56] References Cited

U.S. PATENT DOCUMENTS

| | | | |
|---|---|---|---|
| 3,897,918 | 8/1975 | Gulick, Jr. et al. | 244/3.19 |
| 4,156,877 | 5/1979 | Piesinger | 343/100 SA |

Primary Examiner—Theodore M. Blum
Attorney, Agent, or Firm—R. S. Sciascia; L. I. Shrago

[57] ABSTRACT

A wide bandwidth interferometer which may be employed in a guidance system for a rolling missile delays the radar signals detected by one of the antennas by a fixed amount and the signals detected by the other antenna by a variable amount prior to their multiplication in a device which first advances the phase of one of the signals by 90°. The product signal, which is proportional to the sine of the angle between the rolling axis and the line-of-sight to the target, is integrated in a limited-integrator whose output is summed with a pick-off signal from an onboard gyroscope. The sum signal determines the amount of the variable delay, while the output of the integrator controls the gyroscope to align it with the radar signal direction and the missile steering apparatus to home it on target.

7 Claims, 2 Drawing Figures

BROADBAND INTERFEROMETER AND DIRECTION FINDING MISSILE GUIDANCE SYSTEM

The present invention relates generally to apparatus for and methods of determining the direction of a received radar signal and for pointing a mechanical device in that direction.

In the so-called proportional navigation guidance system, steering to an intercept point necessitates only line-of-sight rate measurements. If an additional purpose of the apparatus is to point a mechanical device, such as an optical system, in the direction of the received radar signal, then line-of-sight direction is needed as well as line-of-sight rate measurement. The homing guidance of a missile utilizing such a system with fixed interferometer antennas further requires that precise measurements of the airframe pitch or yaw motions be substracted from the apparent target motions as observed by the antennas to provide a true measure of target motion and target direction.

In the rolling interferometer, it is also important that the process resorted to for subtracting airframe motion from apparent target motion be independent of the frequency of the arriving radar signal. Also, the interferometer's performance may be improved if the signal processing of the detected signal allows the tracking of phase differences greater than the $2\pi$ radians.

It is, accordingly, an object of the present invention to provide a radar pointing and tracking system which can operate over large look angles with a high degree of accuracy and is conceptually independent of radar freqency.

Another object of the present invention is to provide a radar pointing and tracking system that can be employed in a rolling missile guidance system.

Another object of the present invention is to provide an interferometer which utilizes a variable length delay line in a feedback phase measurement loop so as to permit tracking of phase differences of more than $2\pi$ radians between signals.

Another object of the present invention is to provide a rolling interferometer that contains a provision for insuring that the system locks onto a proper lobe and not an ambiguity.

Figure 2:
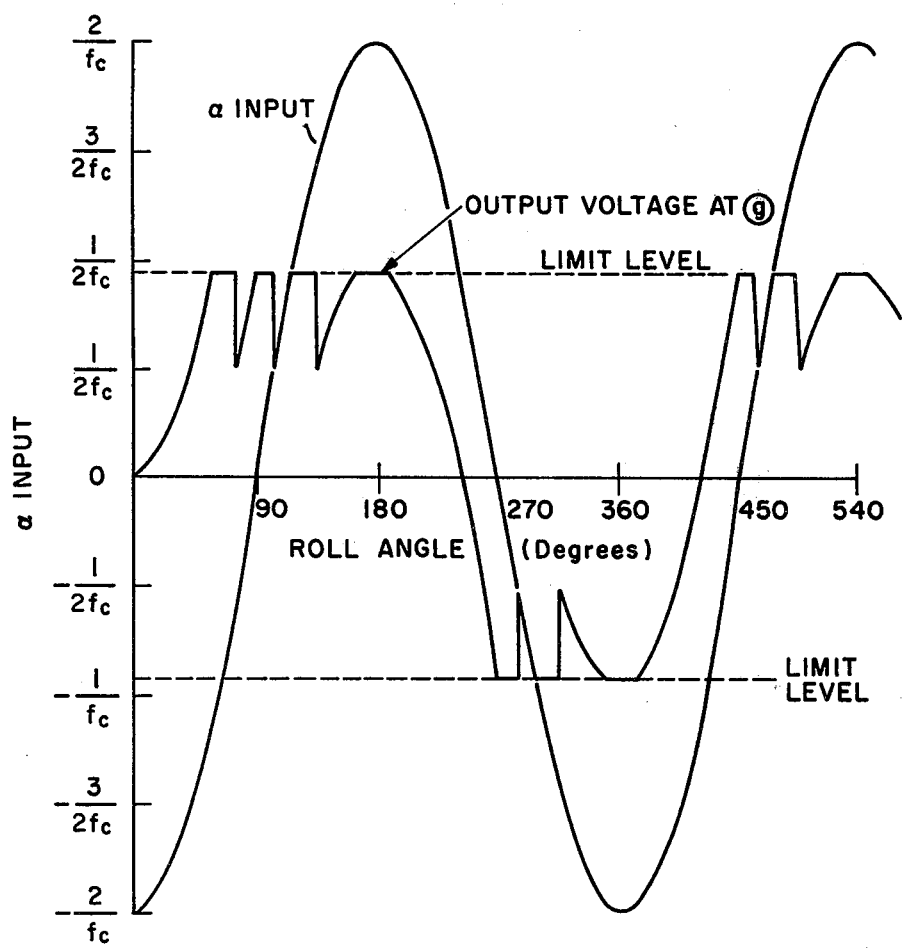

Other objects, advantages and novel features of the invention will become apparent from the following detailed description of the invention when considered in conjunction with the accompanying drawings wherein:

FIG. 1 is a schematic diagram illustrating one preferred embodiment of the invention as applied to a rolling missile; and FIG. 2 is a plot of certain waveforms helpful in understanding the operation of the system of FIG. 1.

Briefly, and in general terms, the above objects of invention are realized by applying the signal detected by one antenna of the fixed interferometer system to a constant delay line of length $T_f$ and the signal detected by the other antenna to a variable delay line of length $T_f \pm T_v$ where $T_v \leq T_f$, and, thereafter, feeding the delayed signals to a multiplying device which introduces a 90° phase lead in the signal that has been delayed by a fixed amount. The resultant product signal, which has a magnitude that is related to the sine of the phase difference between the signals at the input of the multiplier, is amplified and then processed in a limited-integrator. The output of the integrator, the maximum value of which is related to a $2\pi$ radians of phase of the input radar signal, controls both the onboard gyroscope to align it with the received signal direction and the missile steering apparatus to home it on target. A signal derived from the missile gyroscope is also combined with the integrator output in a summation circuit which adjusts the variable delay line. Thus, the variable phase delay is controlled by an inner loop that responds to the phase difference between the signals detected at the missile body-fixed antennas and an outer loop which includes, as an additional signal source, a pick-off signal derived from the gyroscope.

Referring now to FIG. 1 of the drawings which illustrates a rolling interferometer direction finding and missile guidance system, it will be seen that the missile supports a pair of fixed antennas 10 and 11 which are separated by a distance D and symmetrically disposed with respect to the longitudinal axis of the missile. If a source of radiation, such as a radar signal from a target, lies along the line-of-sight line, which is at an angle $\beta$ with respect to the aforementioned axis, there will be a time difference $\alpha$ between the signals detected by the two antennas.

In the example illustrated, the time delay in the signal at antenna 10 is determined by the equation $\alpha = (D \sin \beta)/c$ where c is the velocity of propagation of the microwave radar signal in the medium.

The signal detected by antenna 10 is fed to a fixed length delay line 12 where the delay imparted to it equals $T_f$. The signal detected by antenna 11 is fed to a variable length delay line 13 where a delay equal to $T_f \pm T_v$ is imparted to it. As a condition of operation, $T_v \leq T_f$.

The output of delay line 12 provides one input to a multiplier 14, the other input to which is obtained from variable delay line 13. Multiplier 14 contains an internal +90° phase shift which in the case shown, modifies the phase of the output signal from fixed delay line 12 as part of the multiplication operation.

Thus, the signal detected by antenna 10 may be described as $a = \sin 2\pi f_c[t-\alpha]$; the signal detected by antenna 11 as $b = \sin 2\pi f_c(t)$. After experiencing the fixed delay, signal "a" becomes $c = \sin 2\pi f_c[t - \alpha - T_f]$, and after the 90° positive phase shift, $d = \cos 2\pi f_c[t - \alpha - T_f]$.

With the same notations, the other input to the multiplier 14 may be described as $e = \sin 2\pi f_c[t - T_f - T_v]$.

Multiplier 14 develops a dc voltage or in the case where the incoming signal is a radar pulse, a pulsed video signal. In either event, the product signal will have an amplitude that is a measure of the sine of the phase difference between the two delayed signals. It may be described as $f = \sin 2\pi f_c(\alpha - T_v)$. After amplification in circuit 17, it is fed to a limited integrator 18. This integrator may be of the type that employs a feedback network, consisting of a capacitor in parallel with a pair of oppositely polled series-connected Zener reference diodes, connected around an operational amplifier. When the voltage at the output exceeds the Zener voltage, the capacitor is essentially shorted thereby limiting the integration. If the input polarity is reversed, the integration starts instantly in the opposite direction until the Zener voltage of the other diode is reached.

It would be pointed out that the use of the limiter-integrator combination prevents the additional phase delay that would result if a simple limiter followed the integrator.

The output of integrator 18 is fed to a summation circuit 19, to the torque input of gyroscope 20 and to the apparatus which steers the missile. A second input to the summation circuit 19 is obtained from the gyroscope position pick-off 21, and the variable length delay line 13 is controlled by the resultant summation signal.

It will, thus, be seen that the system of FIG. 1 contains an interferometer detection device, an inner loop consisting of the variable delay line, the multiplier, amplifier, limited integrator, and the summation circuit, and an outer loop which further includes gyroscope 20 and its position pick-off element 21.

Referring again to FIG. 1, an incoming signal originating from any point along the line-of-sight will arrive at antenna 10 with a delay of $\alpha$ from the time of its arrival at antenna 11. If these interferometer antennas are rolled about an axis normal to a line joining their centers at an angular rate of $\omega_r$ then the above delay as a function of time becomes $\alpha = (\alpha max) \sin(\omega_r t)$.

FIG. 2 shows a plot of $\alpha$ and the voltage g at the output of the limited integrator 18 as a function of the rolled angle. Here, the maximum value of $\alpha$ is equal to $2/f_c$, two periods of the microwave carrier. The signal $g = K \int \sin 2\pi f_c(\alpha - T_v) dt$ and is limited to an amount appropriate for controlling the variable delay line 13 to one period of this frequency.

In the operation of the system, when the guidance system is first energized, the initial conditions will be such that both the output of the limited integrator 18 and the signal at the position pick-off 21 will be zero. Consequently, the voltage output of summation circuit 19 will also be zero. These signal conditions result in the setting of variable delay line 13 being equal to the fixed line.

If a signal now enters the antennas from a line-of-sight direction that results in $\alpha$ being equal to two periods of the microwave carrier $f_c$, multiplier 14, which may also be considered a mixer, will produce a zero output signal. This reflects the fact that this circuit develops a voltage proportional to $\sin(2\pi f_c \alpha)$ and in this case equals $2/f_c$. The limited integrator 18 thus continues to remain at a zero voltage output level and the same condition persists at the control input to the variable length line 13. The loop is thus closed and in a stable mode. In a non-rolling case, the voltage output of the limited integrator is at the zero level and is, therefore, not a measurement of $\alpha = 2/f_c$ as desired.

As the interferometer rotates, $\alpha$ varies in the manner shown in FIG. 2, and, consequently, an output signal is developed by multiplier 14, which reflects this motion. Limited integrator 18 now produces a corresponding output, and, hence, a control signal is available at this time for changing the length of line 13 and nulling the multiplier output. This mode of operation persists until the output of integrator 18 reaches the limit level. Prior to this, the voltage developed by the integrator is a measure of the change of $\alpha$.

The limit level of integrator 18 is set to a value that is slightly less than the voltage representing a delay equal to $1/f_c$. Because of the limiting action, the closed loop will cease to hold the voltage of the multiplier output near zero after the limit has been reached. This voltage then follows the function $v = \sin[2\pi f_c(\alpha - T_v)]$. However, $T_v$ remains at a constant value because of the limiting operation. When $\alpha$ attains a value which makes $\alpha - T_v > 1/2f_c$, the sign of v changes and the closed loop becomes unstable. When this occurs, the drive to the variable line causes its length to shift to a new position where the loop is stable, and the output of multiplier 14 may be driven to zero. This process repeats itself as $\alpha$ changes with the roll position.

It will be seen that the output of the limited integrator 18 resulting from the above sequence of operations is symmetric about zero, indicating the absence of any offset ambiguity. An examination of this signal will also show that it has a fundamental component at the roll frequency, a characteristic which is necessary to torque the gyroscope to the line-of-sight direction.

Gyroscope 20 is a two-gimbal free gyro device with the spin axis of its wheel aligned along the roll axis of the missile when in the zero or caged position. Position pick-off potentiometer 21 is arranged to measure the gyro pointing angle about an axis which is normal both to the missile roll axis and a line joining the antenna centers. The gyro possesses a torquing mechanism which precesses it at about the axis of the pick-off, and the torque is applied in a cyclic manner as the missile, the interferometers and the gryo roll about the missile roll axis. Since the interferometer measures the instantaneous angle about an axis normal to the line joining their phase centers, the gyro is precessed about that axis as the missile rolls.

An input signal synchronized with the roll frequency will thus cause the gyro to precess in inertial space at a rate proportional to its amplitude and in a direction in space determined by the phase of this input signal with respect to the roll position. When the input signal is removed, the gyro will maintain its orientation, and the pick-off amplitude signal will be a measure of the maximum angle about the output axis with respect to the roll axis. The phase of this signal will be a measurement of the position around the roll axis.

With the inner loop of the system of FIG. 1 operating in the manner previously described, the input to gyroscope 20 will be a voltage with a fundamental component at the roll frequency, as shown in FIG. 2. Thus, once the minor loop has pulled in, this voltage torques the gyroscope at a rate proportional to its amplitude, and it will precess in a direction determined by the phase of this signal. As the gyro moves towards alignment with the source of the incoming signal, this input voltage reduces, and in the static case, it will go to zero leaving the gyro pointing towards the target. If the target from which the radar signal is reflected moves at some given rate, the input signal performs as an error signal that precesses the gyro at an equal rate. Thus, this signal serves as a measure of the rate of change of the missile-to-target line-of-sight. If it is used as a command to the missile's autopilot, then the conditions for steering with a proportional navigation law are satisfied, and the missile will steer toward a predicted intercept point.

In the absence of any incoming signal at the antennas, there is no output signal from limited integrator 18 and, consequently, no possibility of a false signal being sent to the missile's steering apparatus.

The broadband capability of the system of FIG. 1 comes about as a result of the matching of the line lengths of delay devices 12 and 13 and not as a consequence of any adjustment of electrical phase. Thus, if a steady state condition exists with the variable length line 13 adjusted to a position that provides a null signal at the input of amplifier 17, any subsequent change of the frequency of the detected signal will not disturb this pull. This is because the null depends on the physical length of the variable line 13 to equal the physical length of the distance represented by $\alpha$ which is independent of signal frequency.

What is claimed is:

1. A wide bandwidth interferometer comprising in combination a pair of spaced antennas;
   means for delaying the signals detected by one of said antennas by a fixed amount and the corresponding signals detected by the other of said antennas by a variable amount;
   means for shifting the phase of the signals delayed by said fixed amount by a positive 90° and for multiplying the phase shifted signals and the signals delayed by said variable amount;
   means for integrating the product signal; and
   means for adjusting the orientation of said antennas and said variable amount in accordance with the signal developed by said integrating means so as to align an axis that is perpendicular to the line connecting said antennas with the incoming direction of the signals detected by said antennas.

2. In a system as defined in claim 1 wherein the signal developed by said integrating means is limited to a value that is slightly less than that produced when the path lengths of the signals arriving at said antennas differ by one wavelength.

3. An interferometer guidance system for a rolling missile comprising in combination
   a pair of antennas equally spaced on opposite sides of the rolling axis of said missile;
   means for delaying the signals received by one of said antennas by a fixed amount and the signals received by the other antenna by a variable amount;
   means for advancing the phase of the signals delayed by said fixed amount by 90° and for multiplying the phase shifted signals and the signals delayed by said variable amount;
   means for integrating the product signal resulting from the multiplication,
   a gyroscope mounted in said missile with its spin axis aligned with said rolling axis when in a caged or zero position.
   said gyroscope including a position pick-off means which produces a signal indicative of the gyroscope's pointing angle about an axis which is normal to said rolling axis and a line jouning the antenna centers;
   means for summing the output of said integrating means and the signal produced by said pick-off element;
   means for feeding the output of said integrating means to the torquing mechanism of said gyroscope and the steering mechanism of said missile; and
   means for controlling the amount of said variable delay in accordance with the sum signal produced by said summing means so as to decrease the signal produced by said integrating means.

4. In an arrangement as defined in claim 3 wherein said means for integrating the product signal produces a signal whose maximum amplitude is limited to a value that is related to a particular phase relationship between corresponding signals arriving at said antennas.

5. In an arrangement as defined in claim 4 wherein said particular phase relationship between corresponding signals is 180°.

6. A guidance system for a rolling missile comprising in combination
   a pair of antennas symmetrically positioned about the rolling axis of said missile;
   means for delaying the signals detected by one of said antennas by a fixed amount and the signals detected by the other of said antennas by a variable amount;
   means for processing said delayed signals so as to produce a signal whose amplitude is related to the sine of the angle between said axis and the arrival direction of the signals detected by said antennas;
   means for integrating said last mentioned signal and for limiting the resulting output signal to a preselected value;
   a gyroscope mounted in said missile with its spin axis aligned with the rolling axis when in a zero or caged condition;
   a summation circuit;
   means for coupling said output signal to one input of said summation circuit, to the torque mechanism of said gyroscope and to the missile steering apparatus and for coupling a position pick-off signal from said gyroscope to another input of said summation circuit; and
   means for adjusting the amount of said variable delay in accordance with the output signal of said summation circuit.

7. In a guidance system as defined in claim 6 wherein said preselected value is related to a particular phase relationship between corresponding signals detected by said pair of antennas.

* * * * *